J. BLANC.
Fertilizer.
No. 4,937.
Patented Jan. 21, 1847.
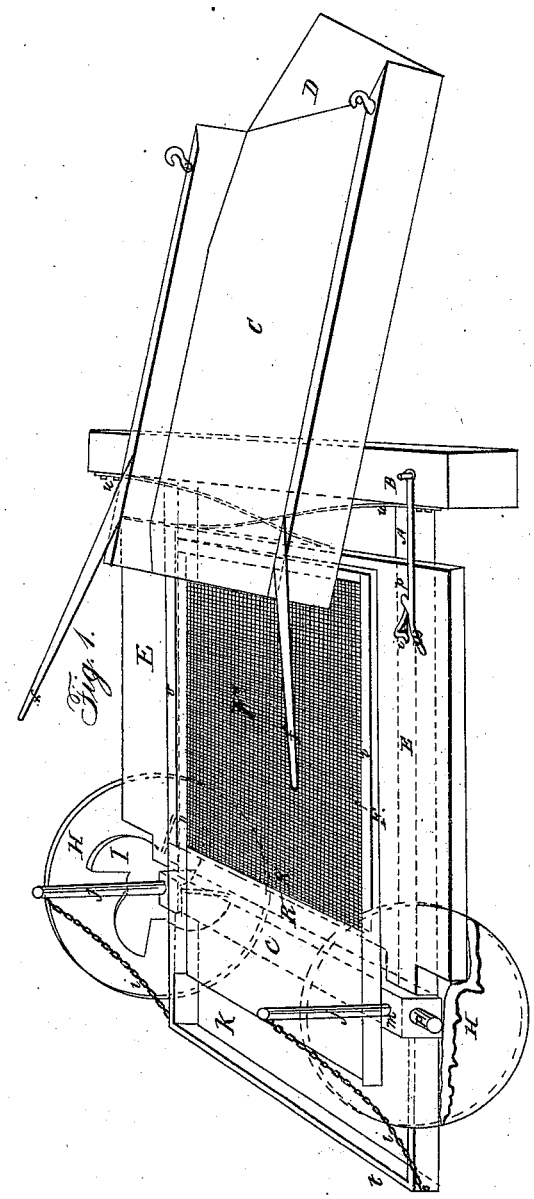
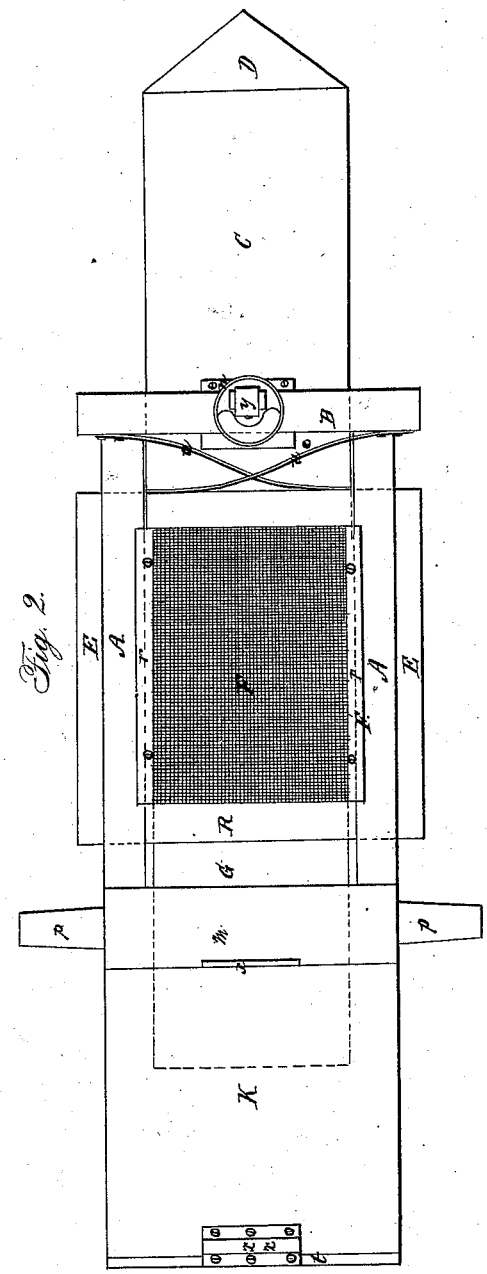

UNITED STATES PATENT OFFICE.

JEAN BLANC, OF NEW ORLEANS, LOUISIANA.

IMPROVEMENT IN FARM-SIFTERS.

Specification forming part of Letters Patent No. 4,937, dated January 21, 1847.

*To all whom it may concern:*

Be it known that I, JEAN BLANC, of the city of New Orleans, of the county of New Orleans, State of Louisiana, have invented a new and useful machine for sifting and cleaning plantations and farms from grass and other rubbish; and I do hereby declare that the following is a full, clear, and exact description of the construction and operation of the same, reference being had to the annexed drawings, making a part of this specification, in which—

Figure 1 is a perspective view; Fig. 2, a bottom view.

C is the scoop or shovel-plow; D, the point of the scoop, covered with sheet-iron. *e* are hooks fixed into the sides of the scoop C, one on each side, by which the machine is drawn. *f* are two handles or levers for the purpose of raising the scoop C out of the ground. E is the sieve-frame, which slides back and forward on the main frame A. A is the main frame of the machine, which is fastened into the axle-tree *m*. *u* are springs for the purpose of forcing the sieve-frame against the axle-tree *m*. H are the wheels upon which the machine rests. 1 is a cam cut in four places for the purpose of forcing the sieve-frame E against or near the head-block B; F, the sieve. G is a piece of iron plate fastened to the sieve for the purpose of conducting the grass and rubbish into box K; K, a box to receive grass and rubbish that could not pass through the sieve F.

Fig. 2, X represents a hinge upon which box K swings, one side of the hinge being fastened to the axle-tree and the other side to the box. *x x* also represent a hinge on which the end of box *t* swings. *l* are chains for the purpose of holding up the end of box K. *j* are upright posts placed just inside of the wheels and fastened into the axle-tree for chains *l* to be fastened to; R, a cross-piece connecting sieve-frame E. *r*, Fig. 2, are slides to guide the sieve-frame E; *y*, a wheel upon which the front part of the machine rests, and at the same time it keeps the front part a certain height from the ground.

The operation of the machine is as follows: Having a scoop or shovel-plow placed in front upon the frame A, (in a proper manner, as shown in the annexed drawings,) from the scoop or shovel-plow the ground passes up and into a movable sifter, where it is moved backward and forward until all of the ground passes through the sieve, and by the forcing of the springs *u*, which act upon the frame E of the sifter, by which it is forced against the axle-tree *m*, which causes the sieve F, with the frame E, to receive a sharp and quick shock, which causes the grass and other matter that is not fine enough to pass through the sieve F to be carried back into box K, which is fastened to the back part of the axle-tree *m*, swinging on a hinge. When the spring has forced the frame-sifter E to the axle-tree it is moved back again by means of cam I with four notches, causing four movements of the sieve-frame forward in one revolution of the main wheel H, while the spring forces it back the same number of times, two springs being fastened at one end on the main cross-piece B, and the other ends act on the sieve-frame E. When the machine is set in motion the ground will run up the scoop, passing into the sifter, where it is shaken back and forth until the ground passes through, and the grass and rubbish continue to be knocked about until it finally reaches the end of the sieve, when it falls into box K, where it remains until it is necessary to have it emptied out, when by unhooking the chain supporting the box K it will be lowered down at one end, while the other end remains close to the axle-tree, swinging on a hinge; and as it is thus disengaged the after part of the box becomes loose, when the rubbish is thrown out. W is a lever, being fastened at one end on the cross-head B. *i* is a pin fastened into frame E for the purpose of preventing the frame E from moving when it is not necessary, so that by moving the lever *w* up to the pin *i*, when the frame E is moving forward, and the pin *i* coming up to the notch in the lever *w*, the lever *w* will prevent the frame E from moving back until required. When the lever is pulled the frame immediately being forced by the spring *u* will move against the axle tree *m*, and so on, as described. *v* are pieces placed on the sides of the sieve to prevent the ground and rubbish from falling over.

What I claim as my invention, and desire to secure by Letters Patent, is—

A scoop or shovel-plow, in combination with the sifter, springs, and cams.

JEAN BLANC.

Witnesses:
A. W. VON SCHMIDT,
JULIUS VON SCHMIDT.